(12) United States Patent
Hirschmann et al.

(10) Patent No.: US 8,837,565 B2
(45) Date of Patent: Sep. 16, 2014

(54) EVALUATION UNIT AND A METHOD FOR DEMODULATION OF OFDM DATA

(75) Inventors: Susanne Hirschmann, Dachau (DE); Martin Weiss, Holzkirchen (DE); Gregor Feldhaus, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 30 days.

(21) Appl. No.: 13/819,944

(22) PCT Filed: Nov. 15, 2011

(86) PCT No.: PCT/EP2011/070125
§ 371 (c)(1),
(2), (4) Date: Feb. 28, 2013

(87) PCT Pub. No.: WO2012/089399
PCT Pub. Date: Jul. 5, 2012

(65) Prior Publication Data
US 2013/0163653 A1    Jun. 27, 2013

(30) Foreign Application Priority Data

Dec. 27, 2010   (DE) .......................... 10 2010 056 327
Apr. 1, 2011   (DE) .......................... 10 2011 006 640

(51) Int. Cl.
*H04B 17/00*     (2006.01)
*H04L 27/26*     (2006.01)
*H04L 27/00*     (2006.01)

(52) U.S. Cl.
CPC ........ *H04L 27/2666* (2013.01); *H04L 27/2602* (2013.01); *H04B 17/00* (2013.01); *H04L 27/2627* (2013.01); *H04L 27/2655* (2013.01); *H04B 17/0065* (2013.01); *H04L 27/0012* (2013.01)
USPC .......................................... 375/224; 375/260

(58) Field of Classification Search
CPC ... H04L 5/0048; H04L 5/0053; H04L 5/0058; H04L 5/067; H04L 5/069; H04L 5/0071; H04L 5/0073; H04L 5/0075; H04L 17/00; H04L 17/0025; H04L 17/004; H04L 17/0065
USPC .......................................... 375/224, 228, 260
See application file for complete search history.

(56) References Cited

U.S. PATENT DOCUMENTS

2010/0165972 A1*   7/2010   Lin et al. ....................... 370/344
2011/0021221 A1*   1/2011   Kondo ........................... 455/501

(Continued)

OTHER PUBLICATIONS

International Preliminary Report on Patentability issued in corresponding Application No. PCT/EP2011/070125 dated Jul. 2, 2013.

(Continued)

*Primary Examiner* — Emmanuel Bayard
(74) *Attorney, Agent, or Firm* — Carter, DeLuca, Farrell & Schmidt, LLP

(57) ABSTRACT

The present disclosure provides an evaluation unit which includes a central data-processing unit, at least one storage unit and an allocation unit, wherein the allocation unit and the at least one storage unit (3) are connected to the central data-processing unit. The central data-processing unit loads at least one OFDM signal from the at least one storage unit and transfers this to the allocation unit. The allocation unit displays the individual signal spaces of the OFDM symbols of the at least one OFDM signal in a constellation diagram and in a frame-output matrix in such a manner that it is possible to allocate via the diagrams at which signal spaces data symbols and/or pilot symbols and/or zero symbols and/or don't care symbols are present and with which modulation type the data symbols and/or pilot symbols are modulated.

18 Claims, 13 Drawing Sheets

(56) References Cited

U.S. PATENT DOCUMENTS

2011/0064018 A1* 3/2011 Hottinen .................. 370/315
2013/0142069 A1* 6/2013 Xing et al. ................ 370/252

OTHER PUBLICATIONS

D. von Droste, "Measurement on Generic OFDM Signals", Oct. 2000, XP002671687, pp. 1-22.

Rohde und Schwarz, "OFDM VSA PC Software", Dec. 2009, XP002671688, pp. 1-111.

International Search Report issued in corresponding application No. PCT/EP2011/070125 mailed May 23, 2012.

Droste, Dorothea, von; Feldhaus, Gregor: Test von OFDM-basierten Übertragungsverfahren mit Signalanalysatoren. In: Rohde und Schwarz. Muenchen. Neues von Rohde und Schwarz. 196/08.

Feldhaus, Gregor: Generic OFDM Measurement Solution: In: 13th International OFDM-Workshop, 2008, Hamburg.

\* cited by examiner

EVALUATION UNIT AND A METHOD FOR DEMODULATION OF OFDM DATA

The invention relates to an evaluation unit, which is used for signal description in OFDM systems (English: orthogonal frequency division Multiplex; German: orthogonaler Frequenzmultiplex), and a method for the operation of this evaluation unit.

In OFDM systems, the information to be transmitted is modulated on a plurality of sub-carriers which are aligned orthogonally to one another. The development of such OFDM systems and the associated components, at the transmitter end and also at the receiver end, is relatively complex. In order to determine errors as early as possible within the development process, it is desirable if the OFDM signal generated and recorded can be analysed. One current method is, for example, to measure the EVM (English: Error Vector Magnitude, German: Betragsfehlervektor). However, during the development process, it often occurs that the OFDM signal to be analysed does not comply with standards or that the OFDM signal to be analysed is a proprietary signal, so that it is not possible for the available test equipment to analyse the OFDM signal as required. To ensure that the available test equipment can still evaluate OFDM signals of this kind, the OFDM signal to be analysed must be described in detail, so that the test equipment is informed, for example, the positions at which data symbols or pilot symbols are present within the OFDM signal.

At the 13th International OFDM Workshop, 2008, in Hamburg, this problem was addressed by Dr. Gregor Feldhaus in a lecture entitled "Generic OFDM Measurement Solution". This lecture, which has been published in the Proceedings of the 13th International OFDM Workshop (InOWo '08), Hamburg, 2008, suggests that, for every individual signal space of an OFDM symbol of an OFDM signal to be analysed, it is specified whether the signal space represents a data symbol or a pilot symbol or a zero symbol or a don't care symbol, and which modulation is used for the signal space. The disadvantage with the solution described is that such an allocation of different signal spaces to the corresponding symbol types requires the setting up of software, which must be adapted for every OFDM signal. In the lecture, it is proposed that, for every allocation of a signal space to a symbol type, a functional call, which indicates whether the signal space is a data symbol or a pilot symbol or a zero symbol or a don't care symbol, must be implemented manually, wherein the latter need not be considered in the further processing. Furthermore, it is also necessary to indicate the modulation type with which the individual signal spaces are modulated. Precisely in the case of OFDM signals, which contain several thousand signal spaces, such a manual allocation is subject to a high degree of error, and is time-consuming and requires a precise knowledge of the standard to be implemented.

The object of the evaluation unit according to the invention and the method according to the invention for operating the evaluation unit is to provide a solution for the allocation of the individual signal spaces of the OFDM symbols within an OFDM signal to known symbol types, such as data symbols or pilot symbols or zero symbols or don't care symbols, as simply, quickly and reliably as possible and, at the same time, to specify the available modulation type of the individual signal spaces.

The object is achieved with regard to the evaluation unit by the features of claim 1 and with regard to the method for operating the evaluation unit by the features of claim 12. Claim 17 specifies a computer program with program-code means for the implementation of all of the method steps when the program is executed on a computer or a digital signal-processor. Claim 18 specifies a computer software product with program-code means, especially stored on a machine-readable carrier, for the implementation of all of the method steps when the software is executed on a computer or a digital signal-processor. The respective dependent claims specify advantageous further developments of the evaluation unit according to the invention and the method according to the invention for operating the evaluation unit.

The evaluation unit according to the invention provides a central data-processing unit, at least one storage unit and an allocation unit, wherein the allocation unit and the at least one storage unit are connected to the central data-processing unit. The central data-processing unit loads at least one OFDM signal from the at least one storage unit and transfers this to the allocation unit. The allocation unit displays the individual signal spaces of the OFDM symbols within the at least one OFDM signal in a constellation diagram and in a frame-output matrix. Via the diagrams, it is possible to allocate which signal spaces are data symbols and/or pilot symbols and/or zero symbols and/or don't care symbols and with which modulation type the data symbols and/or the pilot symbols are modulated.

It is particularly advantageous if the allocation unit displays the individual signal spaces within the at least one OFDM signal in a constellation diagram and in a frame-output matrix and if it is possible to allocate the symbol types with which the individual signal spaces are associated via the diagrams. In this context, a frame-output matrix images the individual signal spaces on the respective sub-carrier. It is clearly visible from the frame-output matrix and also from the constellation diagram, at which positions data symbols and/or pilot symbols and/or zero symbols can be found. Conventional analysis software can calculate, for example, the EVM, from the data symbols, as soon as the corresponding signal spaces are allocated to their corresponding symbol type.

The method according to the invention for operating the evaluation unit, which comprises a central data-processing unit, at least one storage unit and an allocation unit, wherein the allocation unit and the at least one storage unit are connected to the central data-processing unit, comprises several method steps. In a first method step, an OFDM signal is loaded from the at least one storage unit by the central data-processing unit and transferred to the allocation unit. In a further method step, the individual signal spaces of the OFDM symbols within the at least one OFDM signal are displayed in a constellation diagram and a frame-output matrix. In a further method step, the individual signal spaces are allocated either to data symbols and/or pilot symbols and/or zero symbols and/or don't care symbols, and the corresponding modulation type is also allocated to the data symbols and/or pilot symbols.

It is particularly advantageous if the individual signal spaces of the OFDM symbols within the at least one OFDM signal are displayed in a constellation diagram and in a frame-output matrix because an allocation of the individual signal spaces to data symbols and/or pilot symbols and/or zero symbols and/or don't care symbols can be achieved in a very simple manner as a result, and because the corresponding modulation type can also be allocated to the data symbols and pilot symbols. Such an allocation of the individual signal spaces to the corresponding symbol type from the constellation diagram and/or the frame-output matrix is achieved in a particularly simple, rapid and reliable manner and can be repeated for any type of OFDM signal.

A further advantage of the evaluation unit according to the invention is achieved if the allocation unit plots a corresponding number of constellation circles in the constellation diagram corresponding to the modulation type allocated. In this manner, it is possible to specify which signal spaces are associated with the allocated modulation type.

A further advantage of the evaluation unit according to the invention is achieved if the radii of the constellation circles can be adjusted in such a manner that the individual constellation circles do not overlap and/or if the centre points of the constellation circles can be multiplied by a first boosting factor and/or if the imaginary part and the real part of the individual signal spaces can be multiplied by a second boosting factor in such a manner that the maximum possible number of signal spaces are arranged within the constellation circles. If the radii of the individual constellation circles do not overlap, this ensures that the individual signal spaces are allocated only to an ideal constellation vector. As a result, especially those signal spaces which have been modulated with a corresponding modulation type come to be disposed within the constellation circles. The same also applies if the radii of the constellation circles are multiplied by a first boosting factor.

A further advantage of the evaluation unit according to the invention is achieved if the first boosting factor and/or the second boosting factor can be varied within the allocation unit until the maximum possible number of signal spaces is disposed approximately at the centre point of the constellation circles. This ensures that, as far as possible, all signal spaces which have been modulated with the corresponding modulation type also come to be disposed within the constellation circles.

Finally, an advantage is achieved with the evaluation unit according to the invention if all signal spaces which are disposed or marked within the constellation circles can be allocated by the allocation unit to data symbols and/or pilot symbols and/or zero symbols and/or don't care symbols, and if the signal spaces are highlighted in the frame-output matrix. As a result, all signal spaces which have been modulated with the same modulation type can be allocated in a particularly fast and reliable manner to the corresponding symbol type. In this context, a separate function call does not need to be implemented for each signal space.

The method according to the invention for operating an evaluation device also achieves an advantage if the at least one OFDM signal is synchronised in that various settings of timing, frequency and phase are adjusted in succession by the allocation unit, and if the step-width between two adjacent settings is selected by the allocation unit (4) in such a manner that the resulting phase jump is smaller than the minimal phase jump between two signal spaces (13) of a maximum value constellation, and if the settings for the timing (German: Zeitintervall), frequency and phase for which a minimal scattering of the individual signal spaces within the constellation diagram is achieved are analysed. It is particularly advantageous that the OFDM signal is synchronised in its timing, frequency and phase, and that this procedure is based upon an investigation of the scattering of the individual signal spaces. In this context, settings for the timing, frequency and phase are used which lead to the maximum possible number of signal spaces falling within a matrix plotted by the allocation unit in the storage unit. A method of this kind is effective and at the same time can be implemented at reasonable cost.

Finally, in the case of the method according to the invention for operating an evaluation unit, an advantage is achieved, if the allocation unit plots an assignment matrix which contains information on the individual signal spaces which allows a statement regarding whether these are associated with the data symbols and/or pilot symbols and/or zero symbols and/or don't care symbols, and if this assignment matrix can be stored by the allocation unit in the at least one storage unit, especially as an XML file (English: extensible markup language; German: erweiterbare Auszeichnungssprache). The plotting of such an assignment matrix is particularly advantageous because the OFDM signal can be further investigated by means of such an assignment matrix using already available test equipment. The assignment matrix allows the calculation of, for example, the EVM of an OFDM signal. The fact that the assignment matrix can be stored as an XML file allows very simple further processing. An advantage is also achieved if an already plotted assignment matrix which contains information, for example, for an OFDM signal, regarding whether the individual signal spaces are associated with the data symbols and/or the pilot symbols and/or the zero symbols or the don't care symbols, can be loaded. This means that the structure of an OFDM signal can be displayed in a visually very well organised manner.

The various exemplary embodiments of the invention are described by way of example below with reference to the drawings. Identical subject matters provide the same reference numbers. In detail, the corresponding figures of the drawings are as follows.

Figure 1:
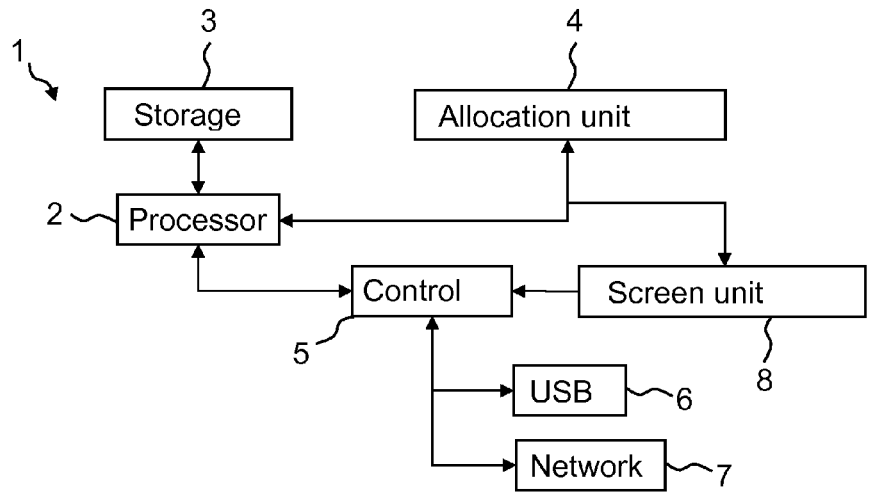
FIG. 1 shows an exemplary embodiment of a block-circuit diagram which shows the structure of the evaluation unit according to the invention.

FIG. 1 illustrates an exemplary embodiment of a block-circuit diagram, which shows the structure of the evaluation unit 1 according to the invention. The evaluation unit 1 according to the invention provides a central data-processing unit 2, at least one storage unit 3 and an allocation unit 4. The central data-processing unit 1 can be one or more processors and/or FGPAs (English: field programmable gate array; German: im (Anwendungs-) Feld-programmierbare (Logik-) Gatter-Anordnung). The at least one storage unit 3 connected to the central data-processing unit 2 can comprise hard disks and/or random access memories and/or USB data sticks (English: universal serial bus; German: Universeller Serieller Bus). A control unit 5 is also connected to the central data-processing unit 2. USB ports 6, network ports 7 and a screen unit 8 are connected to the control unit 5. The screen unit 8 also comprises such screen units 8, which provide, for example, a resistive or capacitive touchscreen. The control unit 5 is connected to the central data-processing unit 2 via known interfaces. These known interfaces comprise, for example, PCI (English: peripheral component interconnect; German: dezentrale Bauteilverbindung), or PCIe interfaces (English: PCI-express; German: PCI-Express). However, any known interfaces are suitable for connecting the control unit 5 to the central data-processing unit 2. The same applies for connecting the other units or peripheral devices mentioned so far.

In this context, an OFDM signal 9 to be analysed is disposed in the storage unit 3. The OFDM signal 9 can be copied via the USB port 6 or the network port 7 to the at least one storage unit 3. It is also possible for a system for generating one or more OFDM signals 9 to be connected to the central data-processing unit 2. Such a system, which is not illustrated in FIG. 1, can copy the generated, at least one OFDM signal directly into the at least one storage unit 3.

This recorded OFDM signal 9 is at least partially synchronised. Accordingly, the already known number of sub-carriers, the length of the Cyclic Prefix (German: zyklisches Präfix), or the Guard Length (German: Schutzlänge), the symbol rate and the carrier frequency had to be entered. An at least partial synchronisation of this kind can be implemented, for example, with the software "R&S®FS-K96/-K96PC OFDM Vector Signal Analysis" manufactured by Rohde & Schwarz.

The central data-processing unit 2 then loads the at least one OFDM signal 9 from the at least one storage unit 3 and transfers this to the allocation unit 4. Such an OFDM signal 9 contains a plurality of OFDM symbols 10, and, for example, the information regarding the sub-carriers on which the respective OFDM symbols 10 are modulated. Each OFDM symbol 10 also contains a plurality of signal spaces 13. The allocation unit 4 displays the individual signal spaces 13 of the at least one OFDM signal 9 in a constellation diagram 11 and in a frame-output matrix 12. The constellation diagram 11 and the frame-output matrix 12 are preferably displayed at the same time side-by-side on the screen unit 8.

Figure 2A:
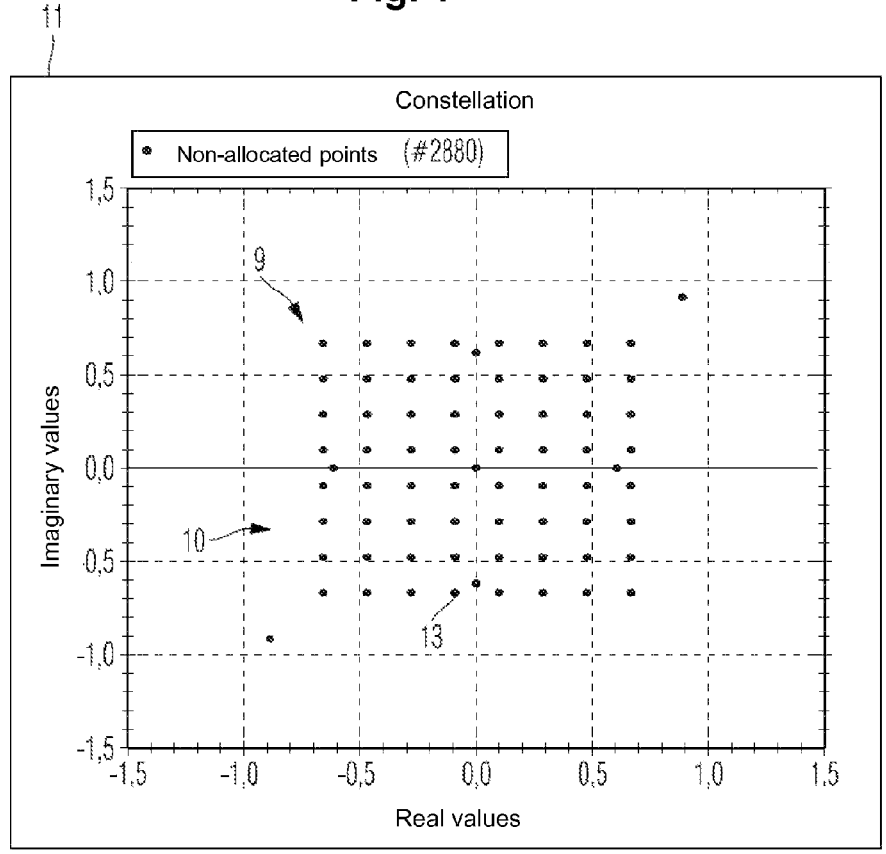
FIG. 2A shows an exemplary embodiment of an OFDM signal, which is displayed in a constellation diagram.

FIG. 2A shows an exemplary embodiment of an OFDM signal 9 which is displayed in a constellation diagram 11. An OFDM symbol 10 in this context is composed of the sum of all sub-carriers and their statuses. Such an OFDM symbol 10 comprises as many signal spaces 13 as there are sub-carriers. Each signal space 13 of an OFDM symbol 10 comprises a real part and an imaginary part. In the example from FIG. 2A, the at least one OFDM signal 9 comprises 2880 signal spaces 13, which are distributed over 45 OFDM symbols 10 and modulated on various sub-carriers. In the constellation diagram 11 from FIG. 2A, the imaginary part of the signal spaces 13 is plotted on the ordinate axis and the real part of the signal spaces 13 is plotted on the abscissa axis.

Figure 2B:
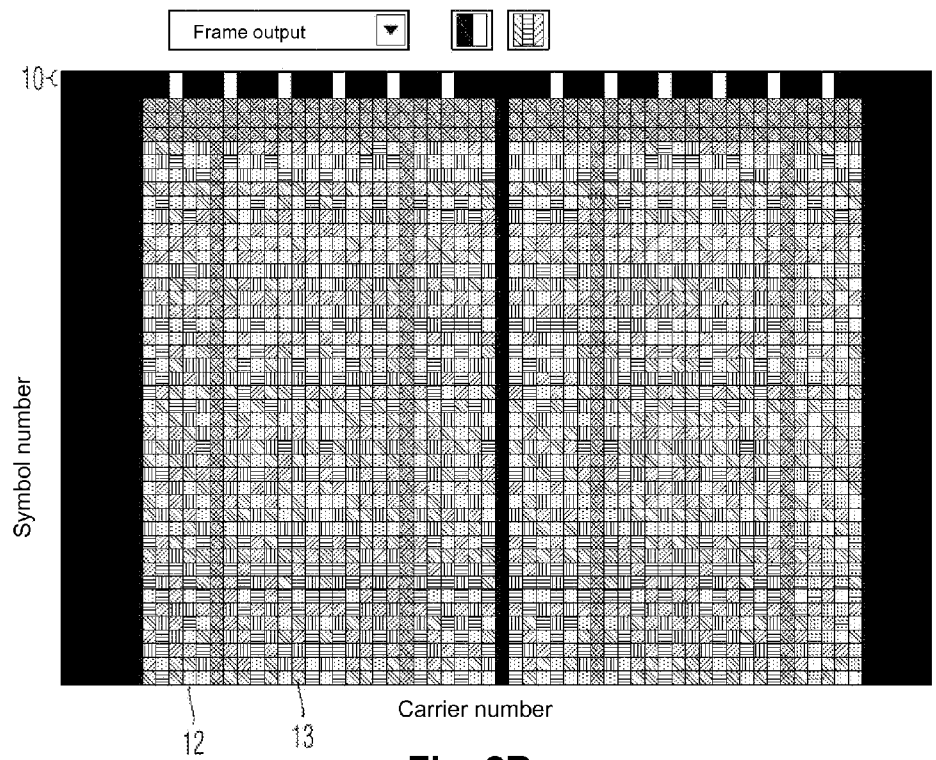
FIG. 2B shows an exemplary embodiment of the OFDM signal which is displayed in a frame-output matrix.

FIG. 2B shows an exemplary embodiment of the OFDM signal 9, which is plotted in a frame-output matrix 12. The row vector of the frame-output matrix 12 contains the number of the corresponding sub-carrier, on which the corresponding signal space 13 is modulated. The column vector of the frame-output matrix 12 reproduces the OFDM symbol number. The OFDM signal 9 is transmitted by a transmitter to the receiver by transmitting the individual OFDM symbols 10 in succession, starting with the OFDM symbol number zero. The corresponding positions within the frame-output matrix 12 provide different colours or shading dependent upon the value of the imaginary part and the real part for the signal spaces 13. To improve visual organisation in FIG. 2B, only eight different shadings are shown.

Figure 3A:
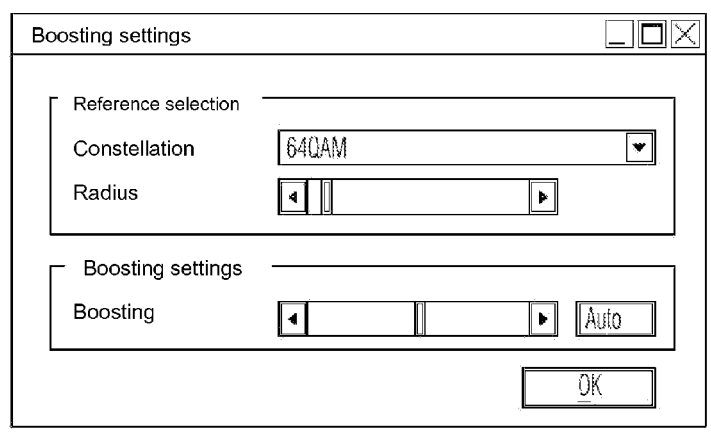
FIG. 3A shows an exemplary embodiment which explains the selection of a modulation type.

FIG. 3A describes how the selection of a given modulation type can be determined. The corresponding modulation type, the radius of the constellation circles 20 and a second boosting factor can be selected in the dialogue window of FIG. 3A. Such a selection is preferably implemented via the control unit 5, to which, for example, a touch-sensitive screen unit 8 is connected. It can be inferred from the OFDM signal 9 of FIG. 2A, that the data symbols are modulated with a 64QAM (English: Quadrature Amplitude Modulation, German: Amplitudenquadraturmodulation).

Figure 3B:
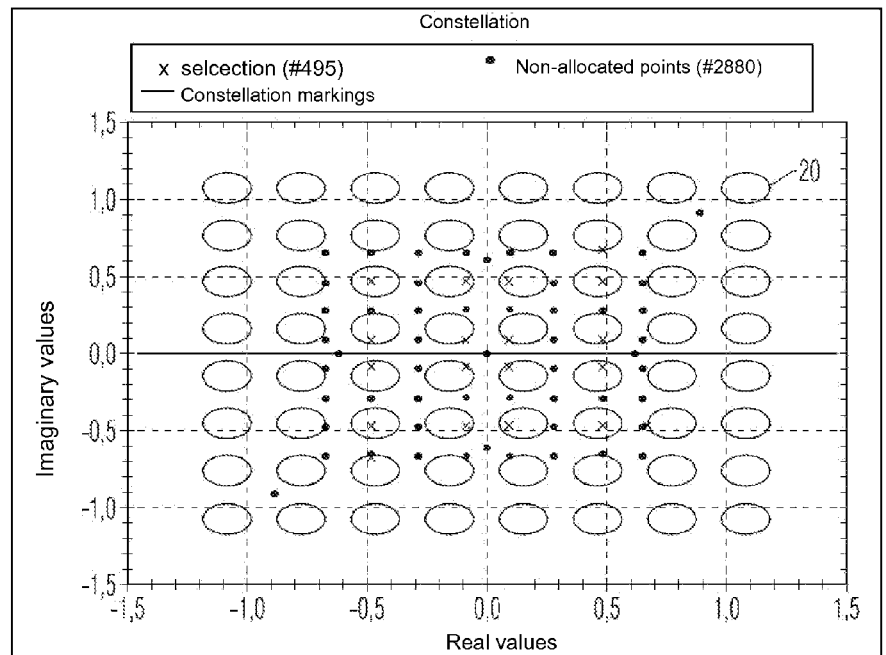
FIG. 3B shows an exemplary embodiment which shows that, dependent upon the selected modulation type, a corresponding number of constellation circles are plotted in the constellation diagram.

FIG. 3B shows an exemplary embodiment which, dependent upon the selected modulation type, contains a corresponding number of constellation circles 20, which are plotted in the constellation diagram 11. 64 constellation circles 20 are visible in FIG. 3B as a whole, because a 64 QAM modulation was selected in the preceding dialogue window of FIG. 3A. It is evident that the constellation circles 20 in FIG. 3B do not agree in their alignment with the plotted signal spaces 13 of the OFDM symbols 10. However, it is also evident that the signal spaces 13 of the OFDM symbols 10 which are disposed within such a constellation circle 20 are highlighted by contrast with the other signal spaces 13. In FIG. 3B, the highlighted signal spaces are displayed as crosses. However, this highlighting can also be implemented with another colour. The signal spaces 13 can also be marked by a user, individually or in groups, for which reason they are highlighted both in the constellation diagram 11 and also in the frame-output matrix 12. This can be implemented, for example, via the touch screen 8 or another entry device. Such highlighting can be implemented in colour but also by displaying a different pattern for the corresponding signal spaces 13. In this context, the constellation circles 20 are arranged side-by-side in the same manner in which the ideal constellation points provided for the corresponding modulation type are conventionally arranged. Alongside a 64QAM modulation, other, different modulation types can also be selected. These comprise, for example, a BSPK modulation (English binary phase-shift keying; German: Zweiphasenumtastung), a QPSK modulation (English: quadrature phase-shift keying; German: Quadraturphasenumtastung), a 45°-QPSK modulation or also a 256QAM modulation, or a plurality of other modulation types.

Figure 3C:
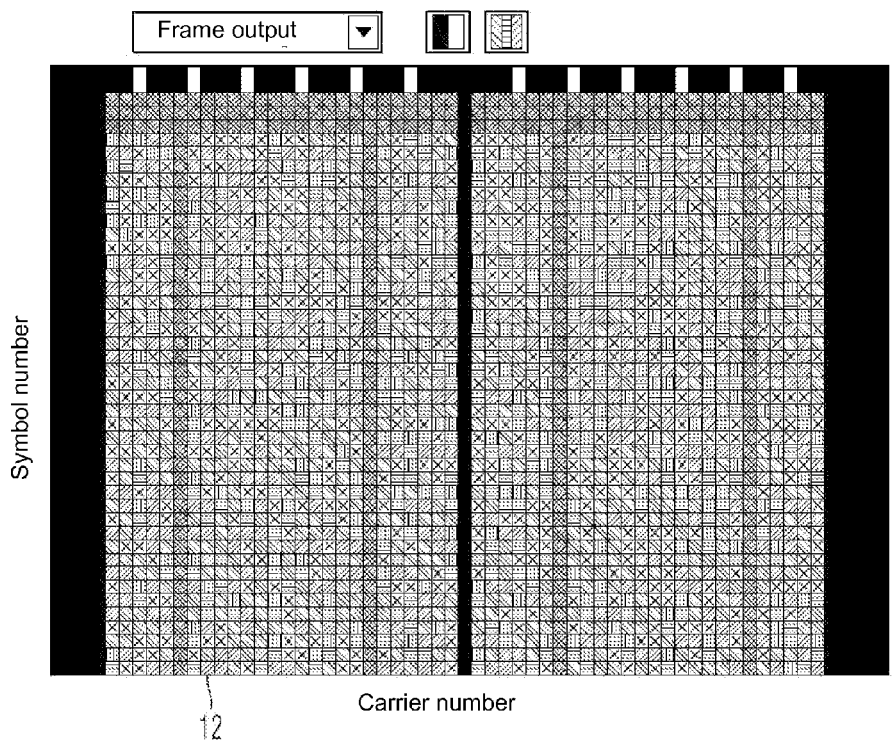
FIG. 3C shows an exemplary embodiment of the frame-output matrix in which the signal spaces, which are disposed within the constellation circles in the constellation diagram, are highlighted.

FIG. 3C shows an exemplary embodiment of the frame-output matrix 12, in which the signal spaces 13 which are disposed in the constellation circles 20 in the constellation diagram 11 from FIG. 3B are highlighted. These signal spaces 13, which are highlighted in FIG. 3B and displayed as a cross, are also displayed as a cross in FIG. 3C. In this manner, the method of operation of the allocation unit 4 according to the invention is very clearly visible. The constellation diagram 11 and the frame-output matrix 12 are both displayed by the allocation unit 4 according to the invention at the same time on the screen unit 8. Signal spaces 13 which are disposed, for example, within the constellation circles 20 are clearly highlighted by the allocation unit 4 both in the constellation diagram 11 and also in the frame-output matrix 12. Accordingly, it is very clearly visible which signal spaces 13 are modulated on which sub-carriers within the OFDM symbols 10 and at which time these are transmitted on the respective sub-carriers in the OFDM signal 9.

Figure 4A:
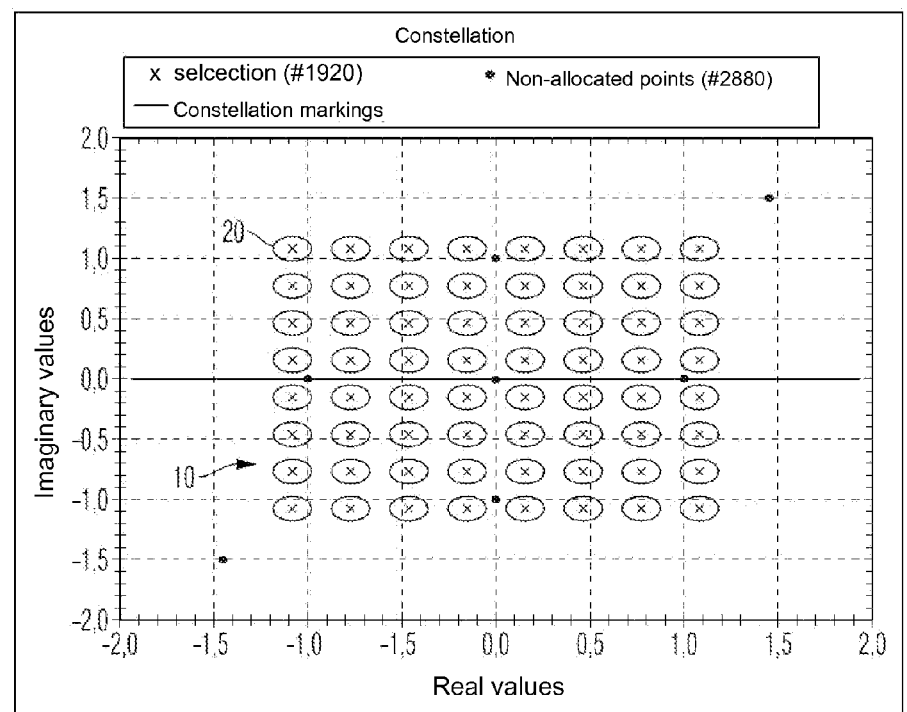
FIG. 4A shows an exemplary embodiment of the constellation diagram, in which the constellation circles and the plotted signal spaces are matched in their radius and their value.

FIG. 4A shows an exemplary embodiment in which the constellation circles 20 and the plotted signal spaces 13 are matched with regard to their radius and value. The image from FIG. 4A is formed in that the radii of the constellation circles 20 can be adjusted in such a manner that the individual constellation circles 20 do not overlap and/or that the imaginary part and the real part of the individual signal spaces 13 can be multiplied by a second boosting factor such that the signal spaces 13 are preferably arranged at the centre point of the constellation circles 20. In this context, the second boosting factor is preferably varied by the allocation unit 4 until the largest possible number of signal spaces 13 is disposed at the centre point of the constellation circles 20. The allocation unit 4 accordingly registers the position of all signal spaces 13 for every adjusted value of the second boosting factor. Using a Brute-Force method (German: Methode der rohen Gewalt), all of the settings of the second boosting factor are run through and the position of the signal spaces 13 is recorded.

The second boosting factor itself is only run through in this manner within meaningful limits and with a previously established step-width. The step-width with which the boosting factor is varied can be modified by the allocation unit 4 dependent upon the quality of the OFDM signal 9. With a high quality OFDM signal 9, as displayed, for example, in FIG. 4A, the step-width, with which the second boosting factor is increased or decreased in every iteration, can be enlarged. The second boosting factor upon which the signal spaces 13 in FIG. 4A are based can accordingly be determined more rapidly. As shown in FIG. 3A, the adjustment of the second boosting factor and the radius of the constellation circles 20 can also be implemented manually, wherein the allocation unit 4 delivers significantly better results within the framework of an automatic scaling. The radius of the constellation circles 20 can also be changed retrospectively in the case of particularly poor OFDM signals 9.

In the exemplary embodiment from FIG. 4A, it is clearly evident that a plurality of signal spaces 13 come to be disposed approximately at the centre point of the constellation circles 20. Because of the fact that pilots are not generally modulated with a 64QAM, it can be assumed that the signal spaces 13 which come to be disposed within the constellation circles 20 are data symbols. It is very clearly evident that the allocation unit 4 highlights those signal spaces 13 in the OFDM symbols 10 which come to be disposed within the constellation circles 20. In the exemplary embodiment from FIG. 4A, the highlighted signal spaces 13 are displayed as crosses. A colour display of the highlighted signal spaces 13 is also possible. The allocation unit 4 accordingly communicates that, of the 2880 signal spaces 13 of the OFDM signal 9, 1920 signal spaces 13 are disposed within the constellation circles 20. Furthermore, it is possible to change the boosting (German: Verstärkung) of the constellation circles 20. In this context, the plotted constellation circles 20 can be multiplied by a first boosting factor. This first boosting factor can be adjusted manually via the control unit 5, but, by preference, automatically by the allocation unit 4, in such a manner that the largest possible number of signal spaces 13 of the OFDM symbols 10 is disposed within the constellation circles 20. By preference, the second boosting factor is first adjusted until a maximum number of signal spaces 13 is disposed within the constellation circles 20. Following this, the first boosting factor can be adjusted until these signal spaces 13 come to be disposed as accurately as possible at the centre of the constellation circles 20, as shown in FIG. 4A.

Figure 4B:
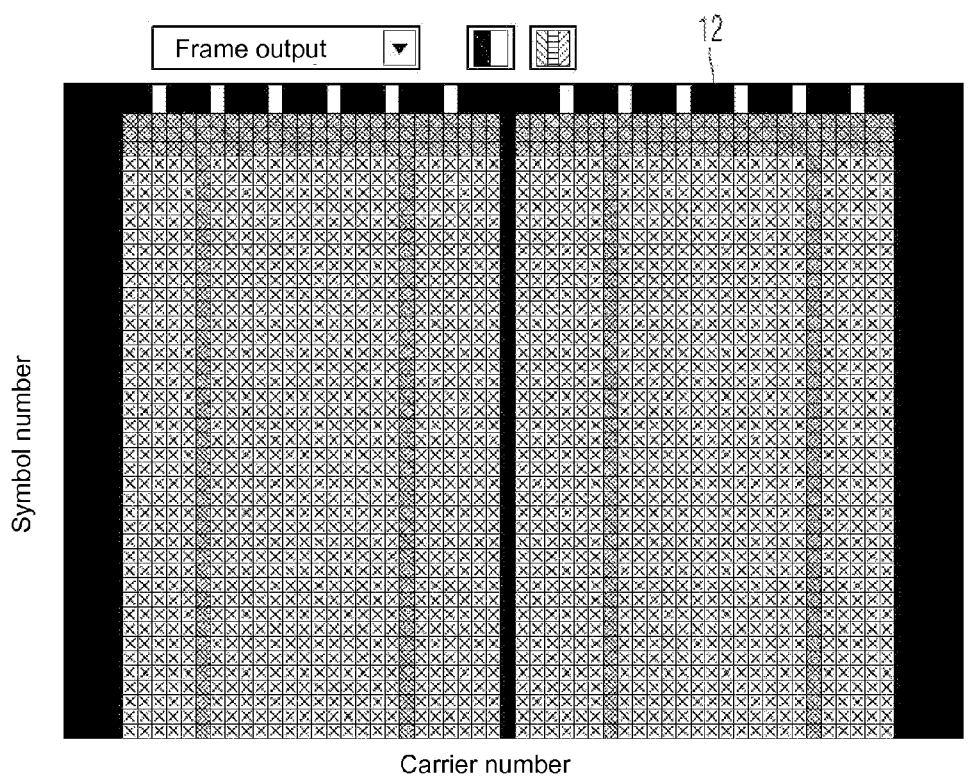
FIG. 4B shows an exemplary embodiment of the frame-output matrix, in which the signal spaces, which are disposed within the constellation circles in the constellation diagram, are highlighted.

FIG. 4B shows an exemplary embodiment of the frame-output matrix 12, in which the signal spaces 13 of the OFDM symbols 10 which are disposed within the constellation circles 20 in the constellation diagram 11 are highlighted. The highlighted signal spaces 13 are also displayed as crosses, wherein a colour display would also be possible. The method of operation of the allocation unit 4 according to the invention within the evaluation unit 1 is very clearly recognisable in FIG. 4B. The signal spaces 13 which are disposed within the constellation circles 20 in FIG. 4A, and highlighted there, are also highlighted by the allocation unit 4 in the frame-output matrix 12 in FIG. 4B. As a result, it can readily be checked whether, for example, the generated data symbols which are marked by the selection of a corresponding modulation type in the constellation diagram 11, are also transmitted by the required sub-carrier at the required time within the OFDM signal 9.

Figure 5A:
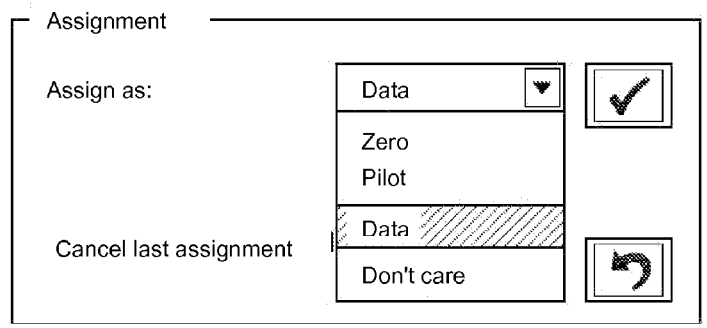
FIG. 5A shows an exemplary embodiment of the assignment of the selected signal spaces to a symbol type.

FIG. 5A shows an exemplary embodiment which describes the assignment of the selected signal spaces 13 to a symbol type in greater detail. In the dialogue window from FIG. 5A, the selected signal spaces 13 can then be allocated to a given symbol type. At present, four different symbol types are available. These comprise the zero symbol (English: zero symbol), the pilot symbol (English: pilot symbol), the data symbol (English: data symbol) and the dummy symbol (English: don't care symbol). Symbols which contain the data for the preamble can, for example, be allocated to the class of pilot symbols. If, for instance, the pilot symbols contain a signalling field (German: Signallisierungsfeld), it may be advantageous to define these as data symbols or don't care symbols in order also to be able to analyse frames (German: Rahmen) with different content within the signalling field. However, a new symbol type can also be set up for the preamble symbol. The selection of the corresponding symbol type is implemented by the control unit 5 to which various input devices are connected. In the example from the preceding figures of the drawings, the signal spaces 13 which come to be disposed within the constellation circles 20 are data symbols. As soon as the corresponding entry has been selected by the control unit 5, the allocation unit 4 assigns the selected signal spaces 13 to the symbol type for the data symbols.

Figure 5B:
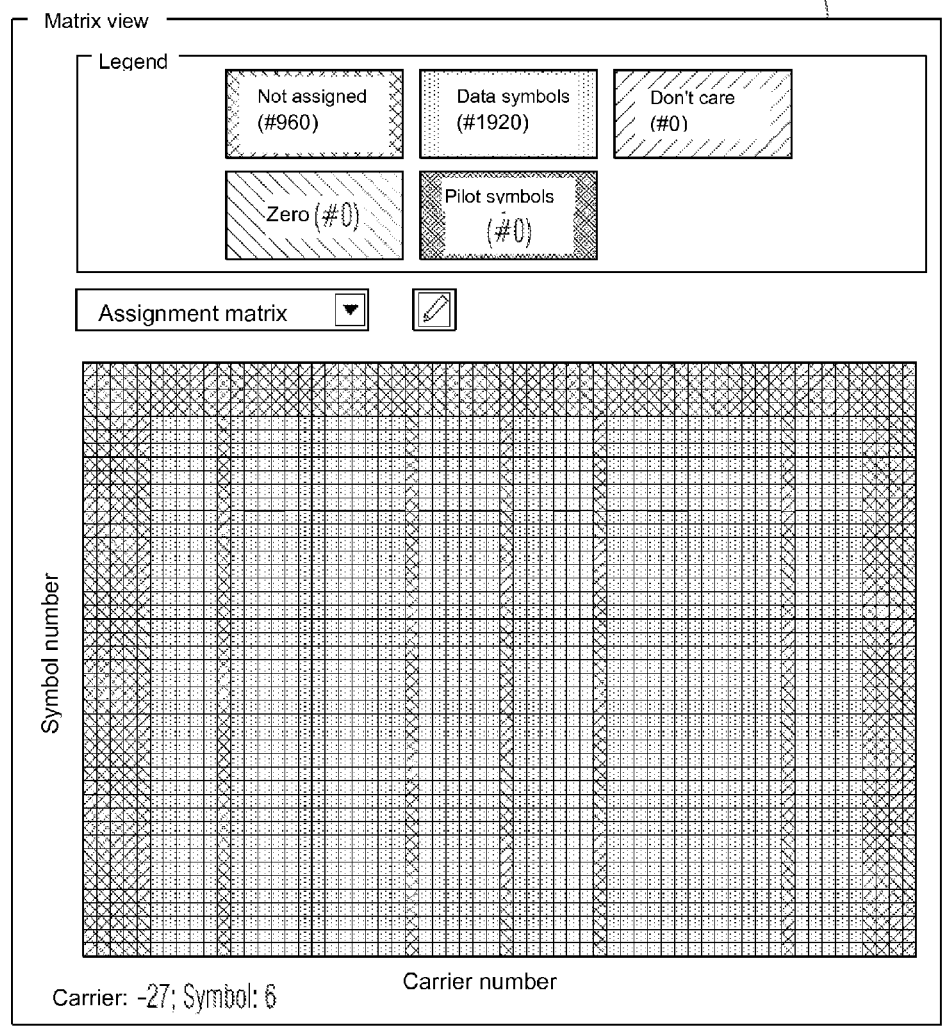
FIG. 5B shows an exemplary embodiment of an assignment matrix which displays the signal spaces already assigned to a symbol type.

FIG. 5B shows an exemplary embodiment of an assignment matrix 21 in which the signal spaces 13 to which a symbol type has already been assigned are displayed. The assignment matrix 21 is displayed by the allocation unit 4 instead of the frame-output matrix 12. The structure of the assignment matrix 21 is implemented in a similar manner to the structure of the frame-output matrix 12. The numbers of the various sub-carriers are displayed in the row vector; the OFDM symbol number is displayed in the column vector. Only the data symbols are displayed in the example from FIG. 5B.

Figure 6:
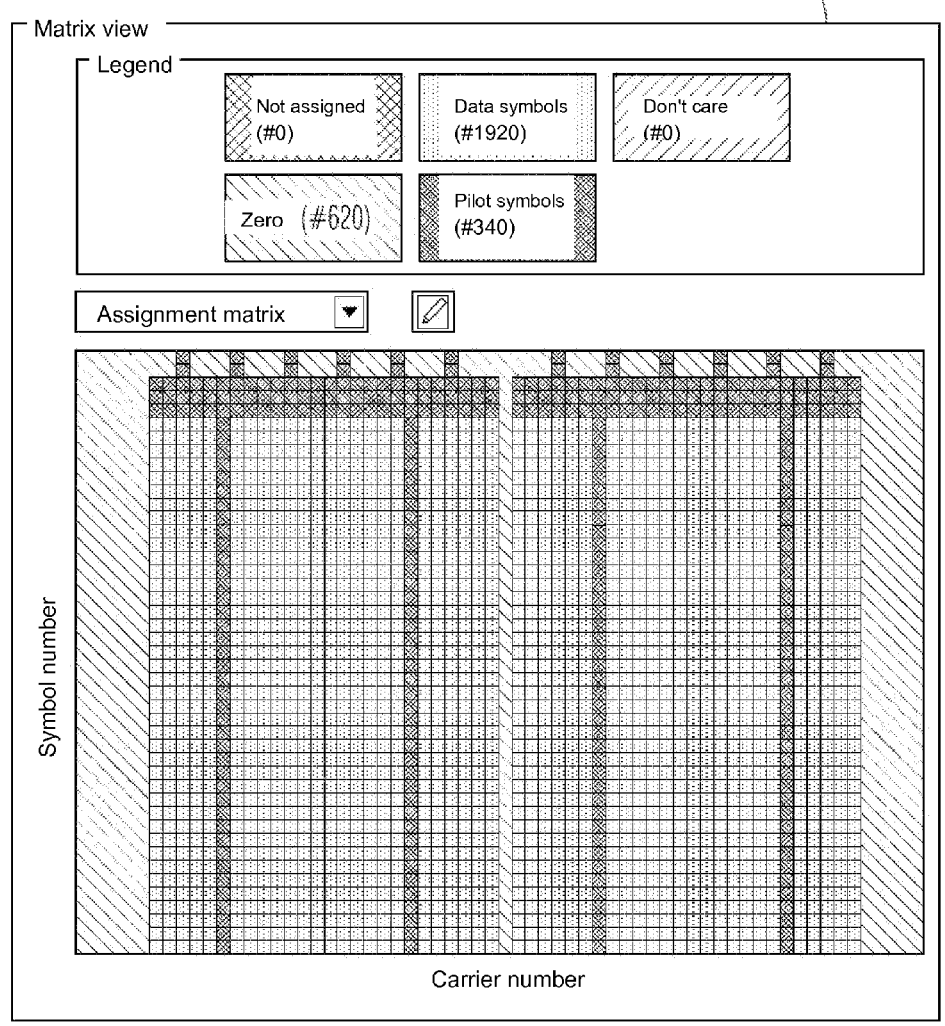
FIG. 6 shows an exemplary embodiment of the assignment matrix, in which all signal spaces of an OFDM signal are assigned to a symbol type.
Figure 7A:
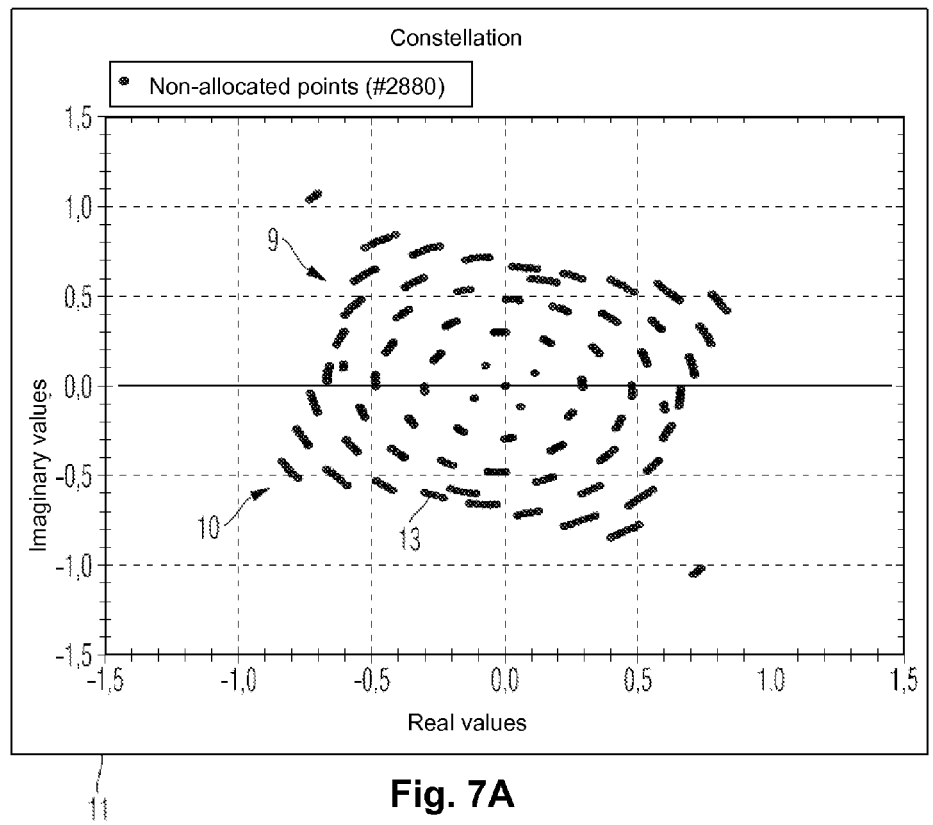
FIG. 7A shows an exemplary embodiment of a not-yet-synchronised OFDM signal, which is plotted in a constellation diagram.

FIG. 6 shows an exemplary embodiment of the assignment matrix 21 in which a symbol type is assigned to all signal spaces of the OFDM symbols 10 of an OFDM signal 9. The different symbol types are displayed in different colours or with different shading by the allocation unit 4 according to the invention. It is evident that the first and the last carrier are used predominantly for the transmission of the zero symbols. These zero symbols, of which the imaginary part and real part provide approximately the value zero, are displayed in FIG. 4A in the middle of the constellation diagram 11. The pilot symbols displayed in FIG. 6 are also visibly displayed on the abscissa axis and the ordinate axis in FIG. 4A. The pilot symbols in this case are modulated, for example, with a 45° QPSK modulation. By comparison with a 64QAM modulation, this modulation type is significantly more robust with regard to interference. Signal spaces 13 of OFDM symbols 10, which are associated with the preamble of the OFDM signal 9 and displayed in FIG. 4A with a value of the imaginary part of approximately −1.5 and respectively 1.5 and a value of the real part of approximately −1.5 and 1.5, are also counted amongst the pilot symbols. Moreover, no don't care symbols are displayed in FIG. 6. Don't care symbols themselves would not be taken into consideration for the analysis of the OFDM signal 9 by subsequent test equipment. The assignment matrix 21 shown in FIG. 6 can be stored by the allocation unit 4 in the at least one storage unit 3. In this context, the assignment matrix 21 is preferably stored as an XML file. Similarly, the allocation unit 4 displays how many signal spaces 13 are assigned to each symbol type on a connected screen unit 8. In FIG. 6, of 2880 signal spaces 13, exactly 1920 are assigned to data symbols, exactly 340 to pilot symbols and exactly 620 to zero symbols. It is also shown that all of the signal spaces 13 are assigned to a symbol type, and that no signal space 13 has been assigned to a don't care symbol. FIG. 7A shows an exemplary embodiment of a not-yet-synchronised OFDM signal 9 which is plotted in a constellation diagram 11. The OFDM signal 9 to be analysed has in fact already been partially synchronised, as already mentioned, for example, because the number of sub-carriers has been indicated, or the length of the Guard Interval, or respectively of the Cyclic Prefix had to be entered. However, the correct assignment of the individual signal spaces 13 in the OFDM signal 9 to data symbols or pilot symbols or zero symbols or don't care symbols requires the frequency, timing and phase of the OFDM signal 9 under investigation to have been synchronised. Timing deviations lead to phase errors for the signal spaces 13, which increase with time and frequency. Frequency errors lead to phase errors for the signal spaces 13, which also increase with time. Both lead to circular distortions in the constellation diagram 20, as displayed in FIG. 7A. Such distortions often prevent an unambiguous allocation of the signal spaces 13 to the respective modulation.

Figure 7B:
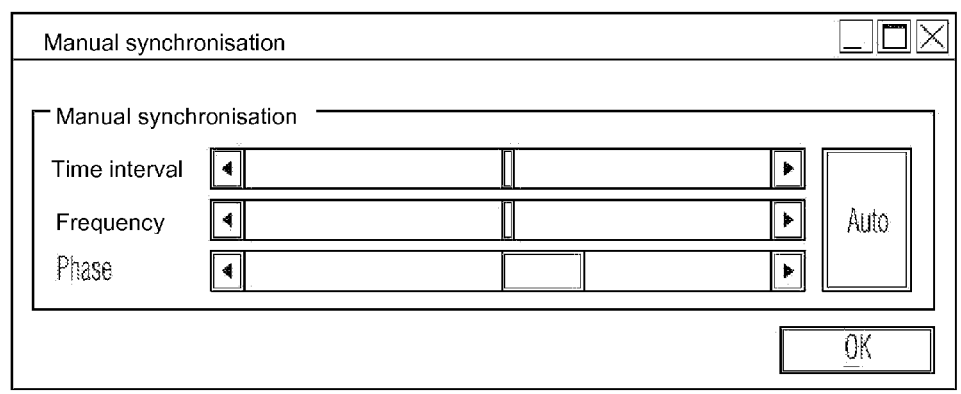
FIG. 7B shows an exemplary embodiment which describes the synchronisation of an OFDM signal.

FIG. 7B shows an exemplary embodiment which describes the possibility of synchronising an OFDM signal 9. As shown in FIG. 7B, the timing, frequency and phase of the OFDM signal 9 to be analysed can be adjusted. This adjustment can be implemented, on the one hand, manually and, on the other hand, automatically. The corresponding instructions are received by the allocation unit 4 from the control unit 5, which is connected to superordinate input devices. In the case of an automatic synchronisation, the allocation unit 4 adjusts various settings of timing, frequency and phase in succession. In this context, the step-width with which the individual settings differ with regard to their values for timing, frequency and phase is selected in such a manner that the resulting maximal phase jump between two adjacent settings for a value of the timing or frequency or phase is significantly smaller than the minimal phase jump between two signal spaces 13 of the highest value constellation. The highest value constellation in FIG. 7B is a 64QAM modulation, so that the minimal phase jump is known. However, initially, only the frequency and the timing are preferably varied. As soon as the most discreet possible distribution of the signal spaces 13 is present in the constellation diagram 20, the phase is rotated until a favourable distribution of the signal spaces 13 with regard to the axes of symmetry "X=0", "Y=0" and "X=Y" is obtained, wherein "X" is the abscissa axis on which the real parts of the signal spaces 13 are plotted, and "Y" is the ordinate axis on which the imaginary parts of the signal spaces 13 are plotted. An adjacent setting should be understood as the setting for the timing, frequency and phase, which adjoins the preceding setting. Such an adjacent setting preferably differs only in one value (timing or frequency or phase) from the preceding setting. Additionally, a consideration of the phase distribution can also be provided. In this context, the phase is taken into consideration in the complex plane of the constellation diagram and not the 2-D distribution, wherein the allocation unit 4 attempts to achieve the most discreet possible values for the phase distribution here. Moreover, a level weighting can also be implemented within the calculation of the phase distribution, so that the zero symbols are not included. Furthermore, the allocation unit 4 analyses the setting of the timing, frequency and phase, for which the scattering of the individual signal spaces 13 in the constellation diagram 11 is minimal. The scattering of the individual signal spaces 13 is minimal especially when these are disposed as close together as possible. The allocation unit 4 can determine this, for example, by plotting a matrix within the storage unit 3 and checking how many signal spaces 13 occur within the latter. With an optimal setting, the minimum possible number of pixels which is used to display the signal spaces 13 within the constellation diagram 11 is used on a connected screen unit 8. The allocation unit 4 can take over the calculation without the screen unit 8 actually showing the corresponding signal spaces 13 of the OFDM symbols 10 for every possible combination of timing, frequency and phase. The correct phase is determined when the signal spaces 13 are aligned as parallel as possible to the ordinate axis and the abscissa axis.

Figure 7C:
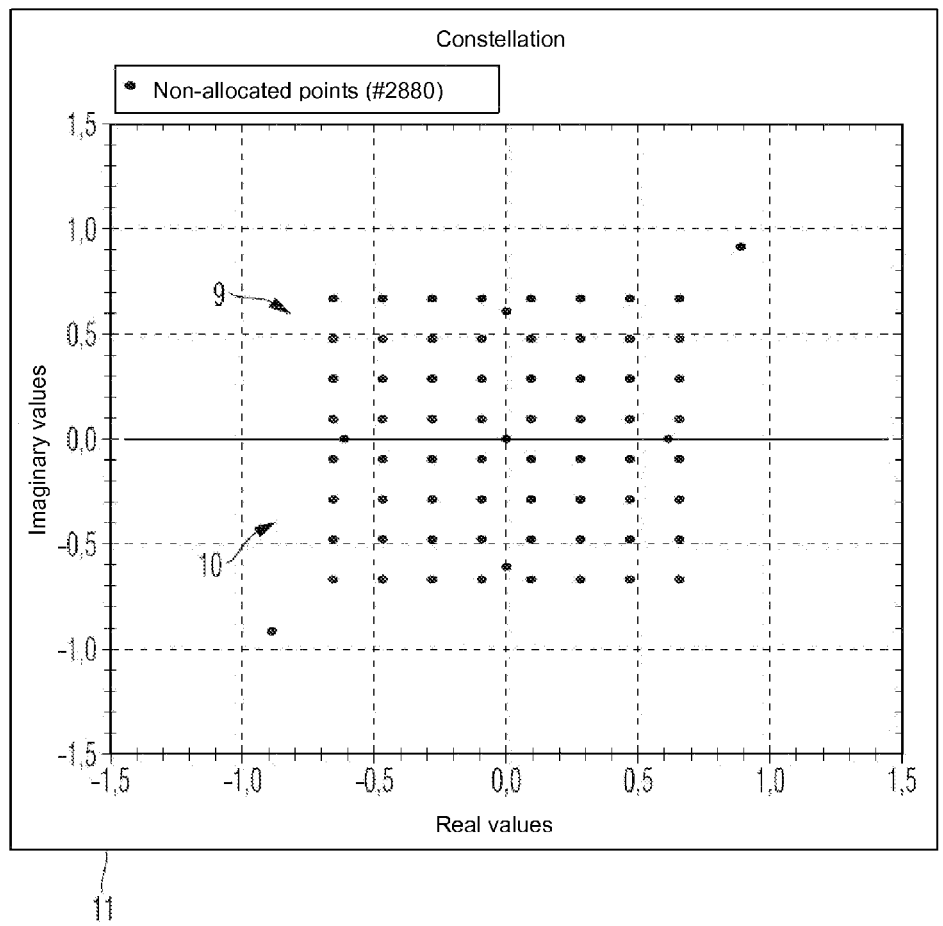
FIG. 7C shows an exemplary embodiment of a synchronised OFDM signal, which is plotted in the constellation diagram.

FIG. 7C shows an exemplary embodiment of an OFDM signal 9 synchronised with the method described above, which is plotted in the constellation diagram 11. Data symbols which have been modulated with a 64QAM modulation are evident. The zero symbols and pilot symbols which were modulated with a 45° QPSK modulation are also visible. Furthermore, the preamble data which are allocated to the pilot data, as already described, are visible.

Figure 8A:
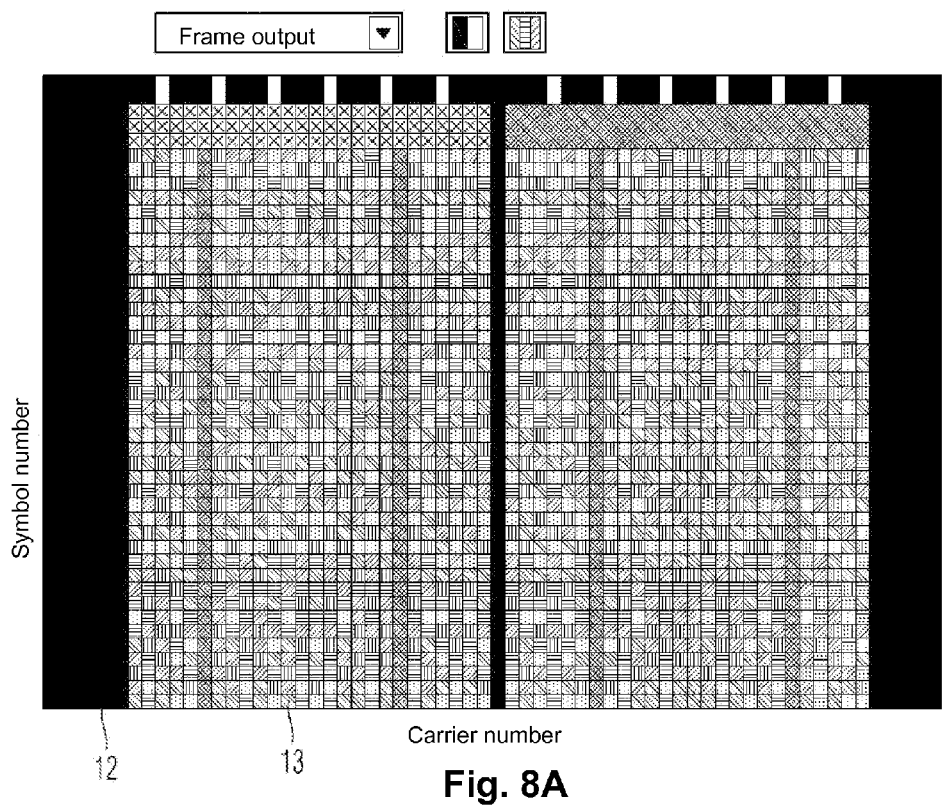
FIG. 8A shows an exemplary embodiment of an OFDM signal, which is displayed in a frame-output matrix, wherein the individual signal spaces can be marked.

FIG. 8A shows an exemplary embodiment of an OFDM signal 9 which is displayed in a frame-output matrix 12, wherein the individual signal spaces 13 can be marked. If no high quality OFDM signal 9 is to be analysed, the individual signal spaces may also be marked only in the frame-output matrix 12. The allocation unit 4 highlights the marked signal spaces 13 in the frame-output matrix 12 and also in the constellation diagram 11. In the exemplary embodiment from FIG. 8A, the highlighted signal spaces 13 are displayed as crosses. The corresponding symbol types, such as data symbols, pilot symbols, zero symbols or don't care symbols, can then be allocated to the highlighted signal spaces 13 by the allocation unit 4. In the exemplary embodiment from FIG. 8A, some of the pilot symbols, for example, are marked within the frame-output matrix 12. Such a marking can be implemented, for example, by the user by means of an input device. The allocation unit 4 according to the invention then clearly highlights the marked signal spaces 13, in the frame-output matrix 12 and also in the constellation diagram 11. For instance, marking preamble symbols within the frame-output matrix 12 and considering these within the constellation diagram 11 makes it immediately evident, for example, whether a boosted QPSK modulation is present. Of course, individual signal spaces 13 can also be marked within the constellation diagram 11 and are then also highlighted by the allocation unit 4 in the frame-output matrix 12. The insertion of constellation circles 20 for the marking is not absolutely necessary for this purpose.

Figure 8B:
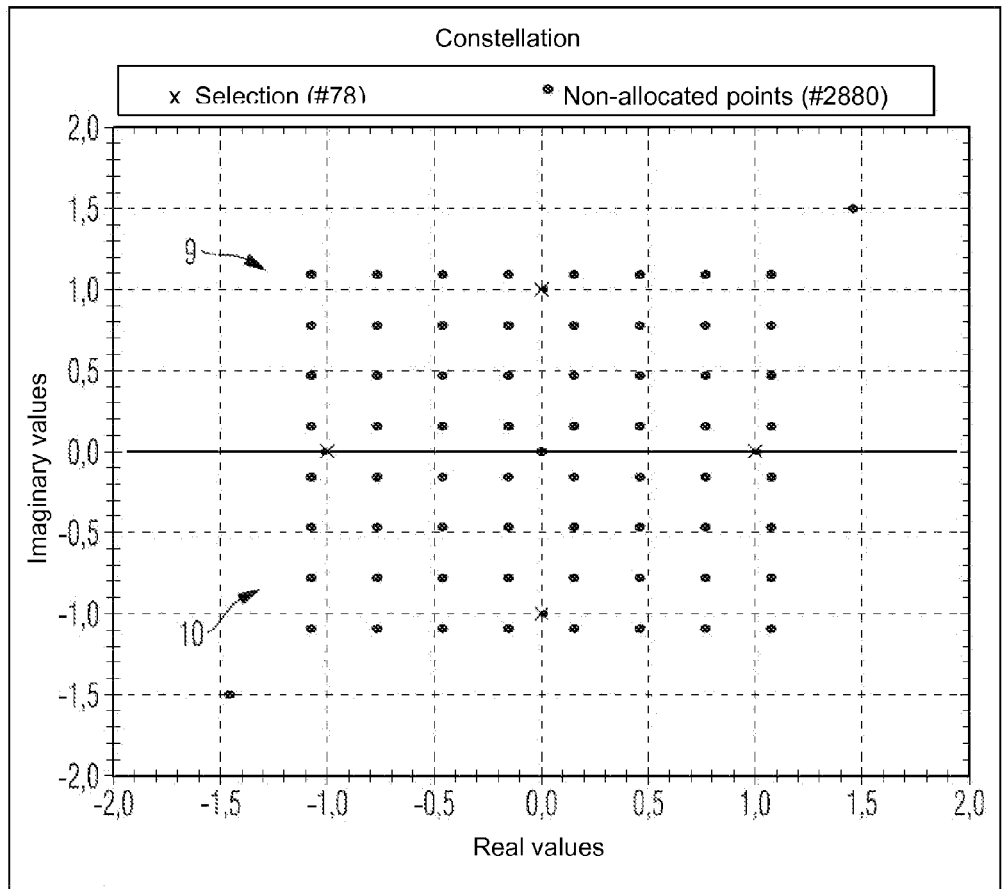
FIG. 8B shows an exemplary embodiment of an OFDM signal, which is displayed in a constellation diagram, wherein the individual signal spaces are highlighted.

FIG. 8B shows an exemplary embodiment of an OFDM signal 9 which is displayed in a constellation diagram 11, wherein the individual signal spaces 13 are highlighted. It is clearly evident that the signal spaces 13 marked in FIG. 8A are also marked by the allocation unit 4 in the constellation diagram 11 from FIG. 8B. The highlighted signal spaces 13 are also displayed as crosses in this context, wherein a colour highlighting can also be realised. Accordingly, the connections between the position of the signal spaces 13 in the frame-output matrix 12 and the signal spaces 13 in the constellation diagram 11 can be displayed in a particularly advantageous manner.

Figure 9A:
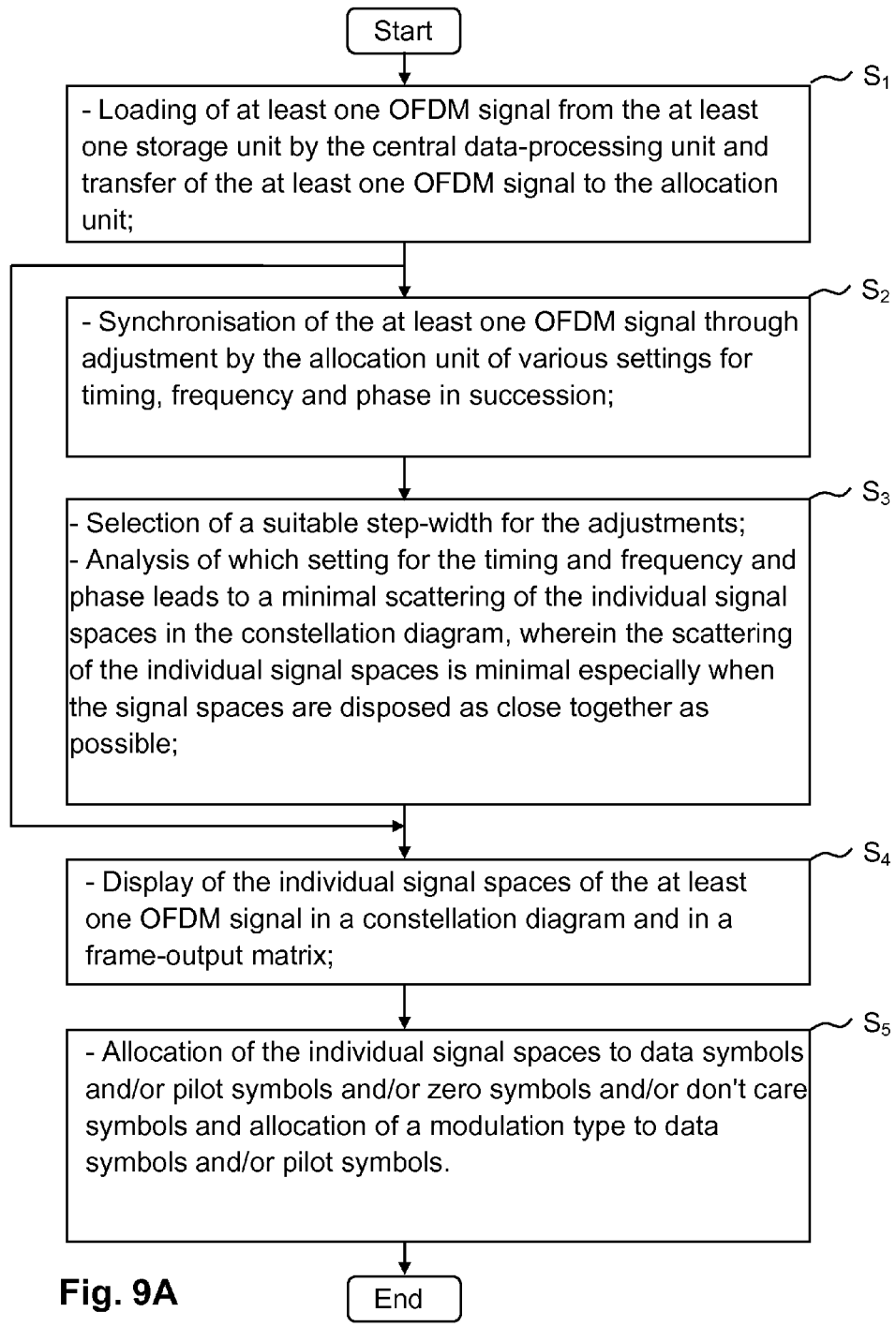
FIG. 9A shows an exemplary embodiment of a flow diagram for the method according to the invention, which describes the synchronisation of an OFDM signal and the allocation of the individual signal spaces to a symbol type.

FIG. 9A describes an exemplary embodiment of a flow diagram according to the invention, which describes in greater detail the method for operating an evaluation unit 1. The flow diagram describes the synchronisation of an OFDM signal 9 and the allocation of the individual signal spaces 13 to a symbol type in greater detail. In this context, the evaluation unit 1 provides a central data-processing unit 2, at least one storage unit 3 and an allocation unit 4, wherein the allocation unit 4 and the at least one storage unit 3 are connected to the central data-processing unit 2.

In a first method step $S_1$, at least one OFDM signal 9 is loaded by the central data-processing unit 2 from the at least one storage unit 3 in order then to transfer this through the central data-processing unit 2 to the allocation unit 4. As already explained, the at least one OFDM signal 9 is to be described in greater detail by the allocation unit 4. This at least one OFDM signal 9 is a recorded OFDM signal 9. This recorded OFDM signal 9 has already been at least partially demodulated. Accordingly, the number of sub-carriers, the length of the cyclic prefixes or the guard length, the symbol rate and the carrier frequency must have already been entered. Furthermore, it can also be indicated whether this is a burst signal or a continuous signal. With these known specifications, the originally recorded OFDM signal can be demodulated so that the known OFDM signal 9 is derived, as plotted, for example, in the constellation diagram 11 in FIGS. 2A and 7A.

In a second method step $S_2$, the at least one OFDM signal 9 can be synchronised by the allocation unit 4 by checking through various settings for timing, frequency and phase in succession. In this context, the step-width by which the individual settings differ with regard to their values for timing, frequency and phase, is selected in such a manner that the resulting maximal phase jump between two adjacent settings for a value either of the timing or the frequency or the phase is significantly smaller than the minimal phase jump between two signal spaces 13 of the highest value constellation. Method step $S_2$ optionally follows method step $S_1$, because the OFDM signal 9 need not necessarily be synchronised, but an already synchronised OFDM signal 9 can be loaded by the central data-processing unit 2 from the storage unit 3 and transferred to the allocation unit 4. As already described, all of the combinations of timing, frequency and phase are adjusted by the allocation unit 4 in succession. In a first step, however, only the frequency and the timing are preferably varied. As soon as the most discreet possible distribution of the signal spaces 13 is present in the constellation diagram 20, the phase is varied or rotated in a second step until a favourable distribution of the signal spaces 13 with reference to the axes of symmetry "X=0", "Y=0" and "X=Y" is obtained, wherein "X" is the abscissa axis on which the real parts of the signal spaces 13 are plotted, and "Y" is the ordinate axis on which the imaginary parts of the signal spaces 13 are plotted. The correct phase is determined when the signal spaces 13 are aligned as parallel as possible to the ordinate axis and the abscissa axis.

In a further method step $S_3$, which follows method step $S_2$, the allocation unit 4 analyses the settings of the timing, frequency and phase for which a minimal scattering of the signal spaces 13 of the OFDM symbols 10 is present in the constellation diagram 11. The scattering of the individual signal spaces 13 is minimal especially when these are disposed as close together as possible. The allocation unit 4 can determine this, for example, by plotting a matrix within the storage unit 3 and checking how many signal spaces 13 fall within it. With the optimal setting, the minimum possible number of pixels which are used for the display of the signal spaces 13 in the constellation diagram 11 is displayed on a connected screen unit 8. It is particularly advantageous that the OFDM signal 9 need not actually be entered on the screen unit 8 for every setting of the timing, frequency and phase, but the values for the imaginary part and the real part of every individual signal space 13 within the OFDM signal 9 are known to the allocation unit 4, and, starting from these values, the scattering of the individual signal spaces 13 is calculated. A non-synchronised OFDM signal 9 is illustrated, by way of example, in FIG. 7A. After the automatic synchronisation by the allocation unit 4, the individual signal spaces 13 are arranged as displayed in the constellation diagram 11 in FIG. 2A.

In the next method step $S_4$, the individual signal spaces 13 of the at least one OFDM signal 9 are displayed by the allocation unit 4 in a constellation diagram 11 and in a frame-output matrix 12. Method step $S_4$ can be performed directly after method step $S_1$ or also after method step $S_3$.

In a further method step $S_5$, the individual signal spaces 13 are allocated to data symbols and/or pilot symbols and/or zero symbols and/or don't care symbols, wherein a modulation type is additionally allocated to the data symbols and/or pilot symbols. Through this allocation, the as-yet-unknown OFDM signal 9 is more accurately described, so that this can be used for a further analysis, for example, with regard to the EVM.

Figure 9B:
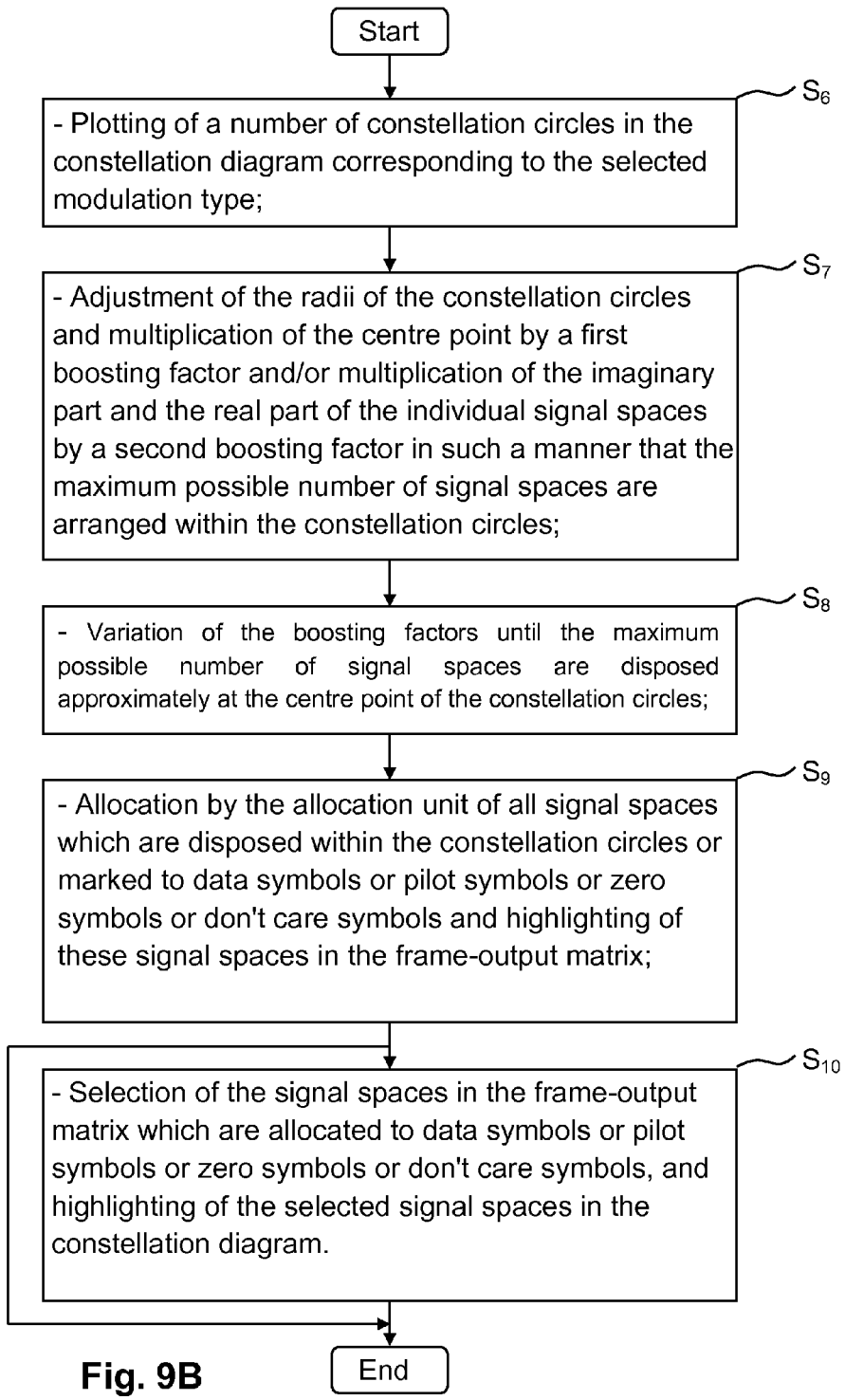
FIG. 9B shows an exemplary embodiment of a flow diagram for the method according to the invention which describes the allocation of the individual signal spaces to a symbol type in greater detail.

FIG. 9B shows an exemplary embodiment of a flow diagram of the method according to the invention, which describes the allocation of the individual signal spaces 13 to a symbol type in greater detail. The flow diagram from FIG. 9B accordingly describes the method step $S_5$ displayed in FIG. 9A more precisely.

Method step $S_6$ is performed after the individual signal spaces 13 of the at least one OFDM signal 9 have been plotted in the constellation diagram 11 and in the frame-output matrix 12. In method step $S_6$, a number of constellation circles 20 corresponding to the selected modulation type is plotted in the constellation diagram 11. For example, a 64QAM modulation can be selected for the OFDM signal 9 from FIG. 2A, so that a total of 64 constellation circles 20 are plotted in the constellation diagram 11 from FIG. 2A.

Following this, method step $S_7$ is performed, in which the radii of the constellation circles 20 are adjusted in such a manner that the individual constellation circles 20 do not overlap and/or by multiplying the imaginary part and the real part of the individual signal spaces 13 by a second boosting factor in such a manner that the maximum possible number of signal spaces 13 is arranged within the constellation circles 20.

In a method step $S_8$, the second boosting factor is varied by the allocation unit 4 until the maximum possible number of signal spaces 13 is disposed at the centre point of the constellation circles 20. In this context, the allocation unit 4 checks, for each adjusted value of the second boosting factor, how many of the signal spaces 13 are disposed approximately at the centre point of the constellation circles 20. This can be implemented via an estimation method, which calculates, for example, the mean value, preferably the RMS (English: root mean square; German: quadratischer Mittelwert), of all values of the signal spaces 13. In this context, the radius of the constellation circles 20 is preferably held constant. The stepwidth with which the second boosting factor is varied can preferably be made dependent upon the quality of the OFDM signal 9. In the case of a high quality OFDM signal 9, as displayed, for example, in FIG. 2A, a relatively larger stepwidth can be selected for the variation of the second boosting factor than if the OFDM signal 9 is a signal on which strong interference is superposed. The same also applies for the first boosting factor, which is adjusted after the adjustment of the second boosting factor. The number of signal spaces which are already disposed within the constellation circles 20 through the performance of method step $S_7$ preferably does not change in method step $S_8$.

In method step $S_9$, all of the signal spaces 13 which are disposed within the constellation circles 20 are allocated by the allocation unit 4 to data symbols or pilot symbols or zero symbols or don't care symbols, wherein these signal spaces 13 are also highlighted in the frame-output matrix 12. Accordingly, it is possible to describe in greater detail an OFDM signal 9 of which the structure is not previously accurately known. As a result of the allocation, it is now known, for example, at which positions within the OFDM signal 9 the data symbols, which are used for subsequent calculation of the EVM, are disposed.

In an optional method step $S_{10}$, the signal spaces 13 of the OFDM symbols 10, which are then allocated to data symbols or pilot symbols or zero symbols or don't care symbols, can be selected in the frame-output matrix 12. The signal spaces 13 in the frame-output matrix 12 are then highlighted in the constellation diagram 11. If it is known, for example, on which sub-carriers the pilot symbols are transmitted, the signal spaces 13 of the OFDM symbols 10 can be allocated directly to pilot symbols on these sub-carriers, regardless of whether these are ultimately all disposed within the constellation circles 20 for the selected modulation type.

Figure 9C:
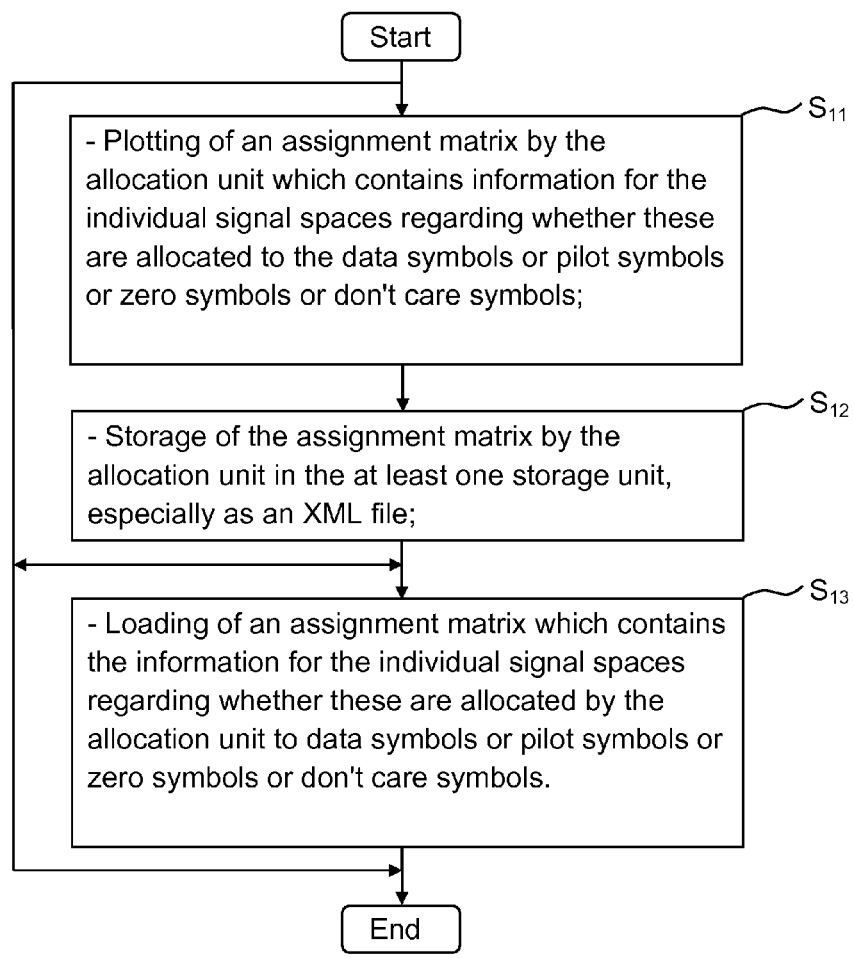
FIG. 9C describes an exemplary embodiment of a flow diagram for the method according to the invention, which describes the plotting of an assignment matrix in greater detail.

FIG. 9C shows an exemplary embodiment of a flow diagram of the method according to the invention, which describes the plotting of an assignment matrix 21 in greater detail. Method step $S_{11}$, which can be implemented after method step $S_5$ or after method steps $S_9$ or $S_{10}$, indicates that an assignment matrix 21 which contains the information for the individual signal spaces 13 regarding whether these are allocated to the data symbols or pilot symbols or zero symbols or don't care symbols is plotted by the allocation unit 4. An assignment matrix 21 of this kind is illustrated, for example, in FIG. 6.

In method step $S_{12}$, the assignment matrix 21 can be stored by the allocation unit 4 in the at least one storage unit 3 as an XML file or in any other required format. The concrete ideal point of the constellation circles 20 for the pilot symbols, at which each signal space 13 of the pilot symbols comes to be disposed, is also stored in the XML file alongside the modulation type.

Optionally, in FIG. 9C, only method step $S_{13}$, in which an already present assignment matrix 21 can be loaded by the allocation unit 4 from the at least one storage unit 3, may be performed. In this manner, it is possible to analyse an already previously described OFDM signal 9 again in greater detail, for example, in order to allocate signal spaces 13 of OFDM symbols 10 which have already been allocated to a symbol type, to another symbol type.

It is also possible to generate an ideal (reference) OFDM signal from a loaded OFDM signal 9. The pilot symbols are set according to their specified value, which is adopted from the loaded OFDM signal 9. In this context, the data symbols can be derived either randomly from the specified modulation alphabet or from the loaded OFDM signal 9. For example, if a 16QAM modulation is present within the loaded OFDM signal 9 and if all of the OFDM symbols 10 contain several data symbols, a random selection is made for each data symbol regarding which of the 16 possible ideal values in the constellation diagram 11 the data symbol adopts. The available zero symbols are set to 0, and don't care symbols can be defined randomly. For instance, a noise can be adjusted via the value assignment of the don't care symbols.

Moreover, when loading the at least one OFDM signal 9 from the at least one storage unit 3, it is possible for the central data-processing unit 2 to select only given OFDM symbols 10 for the further processing.

Furthermore, it is possible to set up user-defined modulation types by adjusting the position and the number of constellation circles 20 randomly.

Within the framework of the invention, all of the features described and/or illustrated can be combined with one another as required. In particular, the dependent claims relating to the method can also be combined with the device claims relating to the evaluation unit 1 and vice versa.

The invention claimed is:

1. An evaluation unit, comprising:
   a central data-processing unit;
   at least one storage unit; and
   an allocation unit, wherein the allocation unit and the at least one storage unit are connected to the central data-processing unit,
   wherein the central data-processing unit loads at least one OFDM signal from the at least one storage unit and transfers it to the allocation unit, and
   wherein the allocation unit displays the individual signal spaces of OFDM symbols of the at least one OFDM signal in a constellation diagram and in a frame-output matrix in such a manner that it is possible to allocate via the constellation diagram and frame-output matrix, at which signal spaces data symbols and/or pilot symbols and/or zero symbols and/or don't care symbols are present and with which modulation type the data symbols and/or pilot symbols are modulated.

2. The evaluation unit according to claim 1, wherein the allocation unit draws a number of constellation circles in the constellation diagram corresponding to an allocated modulation type.

3. The evaluation unit according to claim 2, wherein radii of the constellation circles can be adjusted in such a manner that individual constellation circles do not overlap and/or that centre points of the constellation circles can be multiplied by a first boosting factor and/or that an imaginary part and a real part of the individual signal spaces can be multiplied by a second boosting factor such that a maximum possible number of signal spaces are arranged within the constellation circles.

4. The evaluation unit according to claim 3, wherein the first boosting factor and/or the second boosting factor can be varied within the allocation unit until a maximum possible number of signal spaces are disposed approximately at the centre point of the constellation circles.

5. The evaluation unit according to claim 2, wherein all of the signal spaces which are disposed or marked within the constellation circles can be allocated by the allocation unit to data symbols and/or pilot symbols and/or zero symbols and/or don't care symbols, and that the signal spaces are highlighted in the frame-output matrix.

6. The evaluation unit according to claim 1, wherein the signal spaces which can be allocated to data symbols and/or pilot symbols and/or zero symbols and/or don't care symbols can be selected via the frame-output matrix, and that the selected signal spaces are highlighted in the constellation diagram.

7. The evaluation unit according to claim 1, wherein the allocation unit synchronises the at least one OFDM signal, in that various settings for timing, frequency and phase are adjusted in succession by the allocation unit.

8. The evaluation unit according to claim 7, wherein a step-width between two adjacent settings is selected by the allocation unit in such a manner that a resulting phase jump is smaller than a minimal phase jump between two signal spaces of a maximum-value constellation, and
wherein the allocation unit analyses, with regard to the at least one OFDM signal, for which settings of the timing, frequency and phase a scattering of the individual signal spaces in the constellation diagram is minimal.

9. The evaluation unit according to claim 1, wherein the allocation unit prepares an assignment matrix, which, for the individual signal spaces, contains information regarding whether these are allocated to data symbols or pilot symbols or zero symbols or don't care symbols.

10. The evaluation unit according to claim 9, wherein the allocation unit stores the assignment matrix in the at least one storage unit.

11. The evaluation unit according to claim 1, wherein the allocation unit loads an assignment matrix, which, for the individual signal spaces, contains information regarding whether these are allocated to data symbols or pilot symbols or zero symbols or don't care symbols.

12. The evaluation unit according to claim 10, wherein the allocation unit stores the assignment matrix as an XML file.

13. A method for operating an evaluation unit having a central data-processing unit, at least one storage unit and an allocation unit, wherein the allocation unit and the at least one storage unit are connected to the central data-processing unit, comprising:
loading of at least one OFDM signal from the at least one storage unit by the central data-processing unit and transfer of the at least one OFDM signal to the allocation unit;
displaying individual signal spaces of OFDM symbols of the at least one OFDM signal in a constellation diagram and in a frame-output matrix;
allocating the individual signal spaces to data symbols and/or pilot symbols and/or zero symbols and/or don't care symbols; and
allocating a modulation type to the data symbols and/or pilot symbols.

14. The method according to claim 13, further comprising:
drawing a number of constellation circles in the constellation diagram corresponding to a selected modulation type;
adjusting radii of the constellation circles in such a manner that the individual constellation circles do not overlap and/or multiplication of centre points of the constellation circles by a first boosting factor and/or multiplication of an imaginary part and a real part of the individual signal spaces by a second boosting factor in such a manner that a maximum possible number of signal spaces are arranged within the constellation circles; and
varying the first boosting factor and/or the second boosting factor until the maximum possible number of signal spaces are disposed approximately at the centre of the constellation circle.

15. The method according to claim 14, further comprising:
allocating all signal spaces which are disposed within the constellation circles or marked, to data symbols or pilot symbols or zero symbols or don't care symbols, and highlighting the signal spaces in the frame-output matrix; and
selecting the signal spaces in the frame-output matrix which are allocated to data symbols or pilot symbols or zero symbols or don't care symbols, and highlighting of the selected signal spaces in the constellation diagram.

16. The method according to claim 13, further comprising:
synchronizing the at least one OFDM signal, in that various settings of timing, frequency and phase are adjusted by the allocation unit in succession;
selecting the allocation unit of a step-width between two adjacent settings in such a manner that a resulting phase jump is smaller than a minimal phase jump between two signal spaces of a maximal-value constellation; and
analyzing which setting for the timing, frequency and phase leads to a minimal scattering of the individual signal spaces in the constellation diagram.

17. The method according to claim 13, further comprising:
plotting the allocation unit of an assignment matrix which, for the individual signal spaces, contains information regarding whether this is allocated to the data symbols or pilot symbols or zero symbols or don't care symbols;
storing the allocation unit of the assignment matrix in the at least one storage unit;
loading the allocation unit of an assignment matrix which, for the individual signal spaces, contains information regarding whether this is allocated to data symbols or pilot symbols or zero symbols or don't care symbols.

18. A non-transitory computer-readable medium that stores instructions for causing a processor to execute the method according to claim 13.

* * * * *